United States Patent [19]

Bruckhaus

[11] Patent Number: 6,052,515
[45] Date of Patent: Apr. 18, 2000

[54] SYSTEM AND PROCESS FOR PROVIDING VISUALIZATION OF PROGRAM CODE INTERNAL STATE IN AN OBJECT-ORIENTED PROGRAMMING LANGUAGE

[75] Inventor: Tilmann Bruckhaus, Sunnyvale, Calif.

[73] Assignee: Sun Microsystems, Inc., Palo Alto, Calif.

[21] Appl. No.: 08/884,499

[22] Filed: Jun. 27, 1997

[51] Int. Cl.[7] .................................................. G06F 17/30
[52] U.S. Cl. ......................................................... 395/500.02
[58] Field of Search ..................................... 395/704, 701

[56] References Cited

U.S. PATENT DOCUMENTS 5,564,048  10/1996  Eick et al. ............................... 707/103
5,838,973  11/1998  Carpenter-Smith et al. ........... 395/701

OTHER PUBLICATIONS

Brusilovsky, P., Program Visualization As A Debugging Tool for Novices, ACM, p. 29–30, 1994.
Brown et al., Software Visualization, ACM, p. 463, 1994.
Baker et al. Visualization Software Systems, IEEE, p. 59–67, 1994.
Roman et al. Declarative Visualization in the Shared Dataspace Paradigm, ACM, p. 34–43, 1989.
Kamada et al., A General Framework for Visualization Abstract Objects and Relations, ACM, p.1–39, 1991.
"JavaOne", Sun's 1997 Worldwide Java Developer Conference, Multimedia and 3D Programming with Java, Using VRML as Java's multimedia delivery format, by Chris Marrin et al., Apr. 4, 1997, 8 Pages.
"Software Visualization fro Debugging", by Ron Baecker et al., Apr. 1997, vol. 40, No. 4, pp. 1–23.
"Just Java", by Peter van der Linden, SunSoft Press 1997, pp. 345–347.

Primary Examiner—Tariq R. Hafiz
Assistant Examiner—John Q. Chavis
Attorney, Agent, or Firm—Graham & James LLP

[57] ABSTRACT

A system and a process for providing visualization of program code written in an object-oriented programming language is described. The program code has a plurality of instructions with each such instruction including at least one of a data object and a corresponding data method. A visualization library includes a plurality of visualization classes. Each visualization class includes at least one visual object and at least one corresponding visual action. A visual manager library includes a plurality of visualization control classes. Each visualization control class includes at least one visualization control method. A pre-processor augments the program code with at least one visualization control method from at least one visualization control class in the visual manager library and associates the data object referenced in at least one instruction in the program code with at least one visual object from at least one visualization class in the visualization library and the corresponding data method referenced in the at least one instruction in the program code with the at least one corresponding visual action from the at least one visualization class in the visualization library. A visual manager executes the program code including the at least one visualization control method and the at least one visual action corresponding to the visual object associated with the data object referenced in the at least one instruction responsive to execution of the data method corresponding to the data object.

22 Claims, 6 Drawing Sheets

SYSTEM AND PROCESS FOR PROVIDING VISUALIZATION OF PROGRAM CODE INTERNAL STATE IN AN OBJECT-ORIENTED PROGRAMMING LANGUAGE

FIELD OF THE INVENTION

The present invention relates in general to object-oriented programming languages and, in particular, to a system and process for providing visualization of program code internal state in an object-oriented programming language.

BACKGROUND OF THE INVENTION

Ordinarily, computer software development involves an iterative process of coding and debugging followed by correction of any detected "bugs." Debugging helps to identify syntax and semantic errors. Syntax errors are the result of an incorrect expression of the programming language and prevent the execution of the program. Semantic errors result from the inappropriate but syntactically correct expression of the programming language and cause undesirable dynamic behavior during program execution. Static debugging can be used to detect syntax errors while a combination of static and dynamic debugging can be used to help detect semantic errors.

The same debugging tools and techniques used for traditional control flow-oriented programming languages can be applied to object-oriented languages (OOLs). Static debugging tools typically operate on the program source code prior to compilation and include source code verifiers and the compiler itself. Dynamic debugging tools operate in conjunction with the execution of the program either through modification of the source code or as an adjunct stand-alone program operating to monitor program execution or to process a trace file after execution terminates.

However, distributed interacting software components written in an OOL, such as Java™ language applets and components written for the JavaBeans™ application programming interface (API) and Active-X™ components, can be difficult to debug using these conventional debugging approaches for several reasons. First, the nature of OOL components implies that little or nothing may be known about the internal workings of each component. Second, different components may have been written independently and at different times by separate and geographically distributed development teams among whom interaction may be impracticable or impossible. Moreover, interacting components can be located across distributed locations and organizations and only limited knowledge may be available about interacting components with little known other than their respective origins. The JavaBeans™ API is described in P. van der Linden, "Just Java," pp. 345–347, SunSoft Press (1997), the disclosure of which is incorporated herein by reference. Java™ and JavaBeans™ are trademarks of Sun Microsystems, Inc., Mountain View, Calif. Active-X™ is a trademark of Microsoft Corporation, Redmond, Wash. The general problems associated with software debugging visualization tools are described in R. Baecker et al., "Software Visualization for Debugging," Comm. of the ACM, pp. 44–54, Vol. 40, No. 4 (Apr. 1997), the disclosure of which is incorporated herein by reference.

One prior art approach to debugging involves introducing debug statements in the source code for generating diagnostic output messages during program execution. However, debug statements are generally limited to outputting plain text and therefore lack the user-friendly presentation of a graphical user interface (GUI). Moreover, debug statements are incapable of capturing the overall object context in relation to inheritance, polymorphism and encapsulation at each execution point.

Another prior art approach to debugging for distributed objects is described in the U.S. patent application, Ser. No. 08/399,120, entitled "A System and Method For a Distributed Debugger For Debugging Distributed Application Programs," pending, filed Mar. 3, 1995, the disclosure of which is incorporated herein by reference. This prior art approach describes a system and method for debugging a distributed computer application in which the developer is at one host machine while the application being developed makes use of objects and object implementations which can be located on a different host machine unbeknownst to the developer. However, an approach for providing visualization of program code internal state in an OOL is not disclosed.

Another prior art approach to debugging more specifically directed to Java components is described in C. Marrin et al., "Multimedia and 3D Programming with Java Using VRML as Java's Multimedia Delivery Format," presented at JavaOnes[SM], Sun's 1997 Worldwide Java Developer Conferences[SM], Apr. 4, 1997. This prior art approach suggests integrating VRML and Java components to create three dimensional and multimedia content for use with a GUI, but does not describe an approach to debugging distributed interacting software components written in an OOL. JavaOnes[SM] and Sun's 1997 Worldwide Java Developer Conferences[SM] are service marks of Sun Microsystems, Inc., Mountain View, Calif.

Therefore, there is a need for a system and process for assisting a software developer in understanding the dynamic execution of program code, and particularly understanding distributed interacting software components written in an OOL. Such a system and process would be useful in performing dynamic debugging to help detect semantic errors at program runtime.

There is a further need for a system and process for visualizing the overall object context of related software components for use in debugging in conjunction with a GUI and particularly in debugging distributed interacting software components written in an OOL. Such a system and process would save time and resources during the software development process. Visualization is defined herein as the graphical representation of program data objects represented as visual objects associated with visual actions. Each visual action can be used for modifying the graphical appearance of its associated visual object in response to changes in the instantiations of the actual program data objects themselves.

SUMMARY OF THE INVENTION

An embodiment of the present invention is a system and a process using a computer for providing visualization of the initial state, during execution, of program code written in an object-oriented programming language. The program code has a plurality of instructions with each such instruction including at least one of a data object and a corresponding data method. A visualization library includes a plurality of visualization classes. Each visualization class includes at least one visual object and at least one corresponding visual action. A visual manager library includes a plurality of visualization control classes. Each visualization control class includes at least one visualization control method. A pre-processor augments the program code with at least one visualization control method from at least one visualization control class in the visual manager library and associates the data object referenced in at least one instruction in the program code with at least one visual object from at least one visualization class in the visualization library and the corresponding data method referenced in the at least one instruction in the program code with the at least one corresponding visual action from the at least one visualization class in the visualization library. A visual manager executes the program code including the at least one visualization control method and the at least one visual action corresponding to the visual object associated with the data object referenced in the at least one instruction responsive to execution of the data method corresponding to the data object.

The present invention enhances the understanding of the dynamic execution of an application program through the visualization of program code internal state. The applicability of the invention described herein is particularly suited to an application program which includes distributed interacting software components written in an object-oriented programming language.

Still other embodiments of the present invention will become readily apparent to those skilled in the art from the following detailed description, wherein is shown and described only the embodiments of the invention by way of illustration of the best modes contemplated for carrying out the invention. As will be realized, the invention is capable of other and different embodiments and several of its details are capable of modification in various obvious respects, all without departing from the spirit and scope of the present invention. Accordingly, the drawings and detailed description are to be regarded as illustrative in nature and not as restrictive.

DETAILED DESCRIPTION

I. System for Providing Visualization of Program Code Internal State

A. System Components

Figure 1:
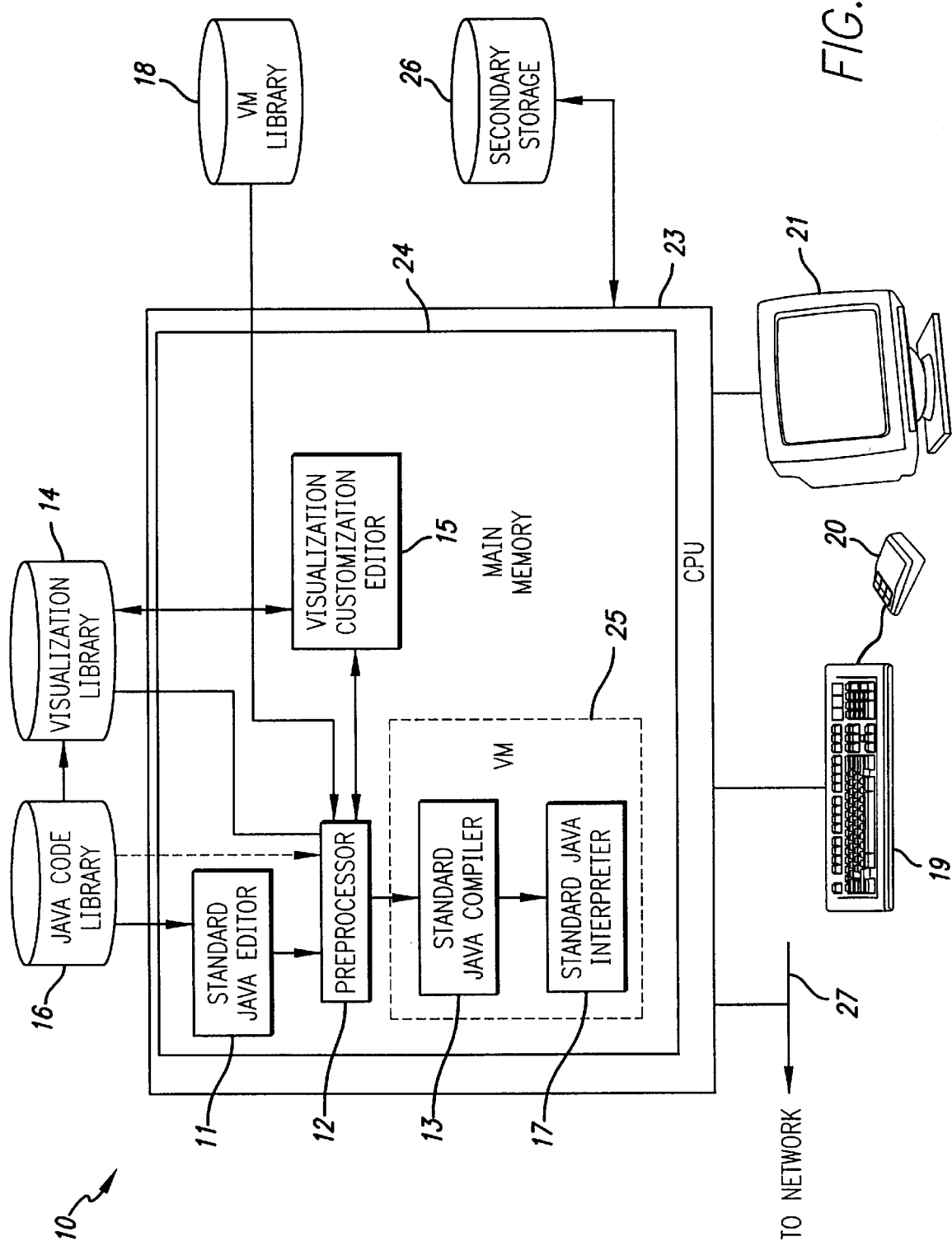
FIG. 1 is a functional block diagram of a system for providing visualization of program code internal state in an object-oriented programming language according to the present invention.

FIG. 1 is a functional block diagram of a system for providing visualization of program code internal state 10 in an object-oriented language (OOL) according to the present invention. The system 10 is a conventional programmed digital computer, including a central processing unit (CPU) 23, a main memory 24 interconnected with the CPU 23 and user interfacing devices, such as a keyboard 19 and mouse 20 and a monitor 21. The system 10 can also include devices for accepting computer-readable storage mediums (not shown) and can be interconnected with a network 27 for exchanging data and control signals transmitted as a data signal in a carrier wave. The individual components implementing the system 10 are interconnected over a central system bus (not shown) used for exchanging addresses, data and control signals, although other forms of component interconnections are possible.

Upon boot-up of the system 10, an operating system and support services, such as device drivers and related interfaces, are loaded into the main memory 24. Thereafter, the system 10 under the control of the CPU 23 runs application programs, such as a standard Java editor 11, preprocessor 12, standard Java compiler 13, visualization customization editor 15 and standard Java interpreter 17. These application programs are described further hereinbelow. The program code for each application program is first retrieved from a secondary storage device 26 and stored into the main memory 24 for execution by the CPU 13.

In the described embodiment, the system 10 is a Sun SparcStation™ 5 workstation computer running the Solaris™ operating system, a version of the UNIX® operating system and configured with 64 megabytes of random access main memory. However, use of the processes described and suggested herein are not limited to a particular computer configuration. SparcStation™ and Solaris™ are trademarks of Sun Microsystems, Inc., Mountain View, Calif. UNIX® is a registered trademark of The Santa Cruz Operation, Santa Cruz, Calif. The application programs will now be described.

B. Application Programs

The following application programs are described in the context of the Java programming language. Particular Java language methods and data types are described. However, the applicability of the present invention is not limited to solely Java-language based uses and would apply equally to other OOL environments.

The standard Java editor 11 is a program development environment, such as the Java Workshop™ or Java Studio™ products licensed by Sun Microsystems, Inc. Mountain View, Calif. Its basic purpose is to support the writing of Java source code. The standard Java editor 11 provides developer tools, such as an editor, class browser, project and portfolio manager and revision release system.

Three libraries of Java methods are maintained: a Java code library 16, a visualization library 14 and a visualization manager (VM) library 18. First, the Java code library 16 stores application source code for fundamental Java classes and third party Java classes. Throughout the development cycle, the standard Java editor 11 references the Java code library 16 as needed to resolve fundamental class calls and the like. The Java code library 16 is typically maintained on a secondary storage device interconnected with the system 10. Java Workshop™ and Java Studio™ are trademarks of Sun Microsystems, Inc., Mountain View, Calif.

Second, the visualization library 14 stores Java visualization classes used by the VM 25 for providing visualization of the program code internal state during execution. The VM 25 is further described hereinbelow. The visualization library 14 is categorized into three functional levels. At the lowest level, Java language constructs are visualized. These include the following:

(1) Embedded objects
(2) Derivation
(3) Overloading
(4) Assignments
(5) Case Statements
(6) Data Types
(7) Inheritance
(8) Polymorphism
(9) Pointers
(10) Flow Control
(11) Method Invocations
(12) Method Calls The middle level stores visualization routines used for visualizing standard Java foundation classes, packages and libraries, such as referenced from the Java code library 16. The highest level stores visualization routines for routines which inherit from third party libraries or create objects. The visualization library 14 is typically maintained on a secondary storage device interconnected with the system 10.

The visualization library 14 builds on the standard Java virtual machine model by providing user controls for performing visualization during execution. The controls include, by way of example, the following control methods:

(1) Construct/Destruct: Enables dynamic creation or destruction of visualization class objects.

(2) Zoom: Enlarges or decreases physical screen space used to visualize a specific object.

(3) Hide/Hide Details/Hide Included Objects/Show/Show Details/Show Included Objects: Enables the hiding or displaying of complete, abstracted details regarding or included classes and objects.

(4) Speed Up/Slow Down: Enables single stepping or break point execution.

(5) Layout: Used for positioning screen objects, including cascading, tiling and user-defined layouts.

(6) Stretch/Rotate/Mirror: Used for modifying the displaying of visualized objects.

It is critical that each visualization method incorporate and implement each of the features listed above for use by the VM 25. By using the foregoing exemplary control methods, the Java language, and any Java class in general, can be augmented with visualization for classes using data types such as integer, Boolean, string and so forth. Moreover, new Java classes can be visually debugged without having to write new visualization classes by merely normalizing the classes and objects to these control methods.

Third, the VM library 18 stores visualization control statements used by the VM 25 during execution. The VM library 18 is typically maintained on a secondary storage device interconnected with the system 10.

The pre-processor 12 instruments Java source code received from the standard Java editor 11 by providing calls to the routines for visualizing the program code internal state. The pre-processor 12 is typically invoked as the first pass of program compilation and may be implicitly invoked by the compiler 13. The pre-processor 12 adds visualization calls into a primary Java class 31 (shown in FIG. 3) by inserting method instances of Java visualization classes from the visualization library 14 and visualization control statements from the VM library 18. In addition, the pre-processor 12 adds calls to any required standard Java classes from the Java code library 16. Operation of the pre-processor 12 is further described hereinbelow with reference to FIG. 4.

The standard Java compiler 13 and standard interpreter 17 respectively compile and interpret the Java source code output by the pre-processor 12 and are collectively referred to as the Visualization Manager (VM) 25. The VM 25 manages the execution of the visualized program using a graphical user interface (GUI) displayed on the monitor 21 and responsive to user feedback received via the keyboard 19 and mouse 20. Although illustrated in FIG. 1 as separate individual components, the pre-processor 12, standard Java compiler 13 and standard Java interpreter 17 can be a single application program, such as a Just-In-Time (JIT) or Java Virtual Machine (JVM) compiler used for pre-processing, compiling and interpreting Java source code augmented with visualization classes.

In a further embodiment, the system 10 includes a visualization customization editor 15 for creating new and for modifying existing visualization classes stored in the visualization library 14. A new visualization class may be created, for example, when a visual representation, such as a box displaying numbers, is to be replaced by another, such as a more sophisticated rendering of an input form. The visualization customization editor 15 can receive processed Java source code from the pre-processor 12 or operate independently using ordinary Java source code.

The visualization customization editor 15 includes a toolbox of standard visual objects 39, 41 and visual actions 40, 42 (shown in FIG. 2) that can be composed into visualization behaviors for newly-developed Java classes. These visualization behaviors include graphical objects, such as boxes, circles and balls, and actions, such as drop, raise, grow, shake and sound alarm. In a still further embodiment, the functionality of the visualization customization editor 15 can be enhanced by enabling the attachment of VRML scripts to Java classes for providing multimedia functionality.

Preferably, the visualization customization editor 15 enables the user to graphically create visualization classes. An example of a suitable visualization customization editor 15 is a VRML script editor.

II. Exemplary Java Visualization Classes

Figure 2:
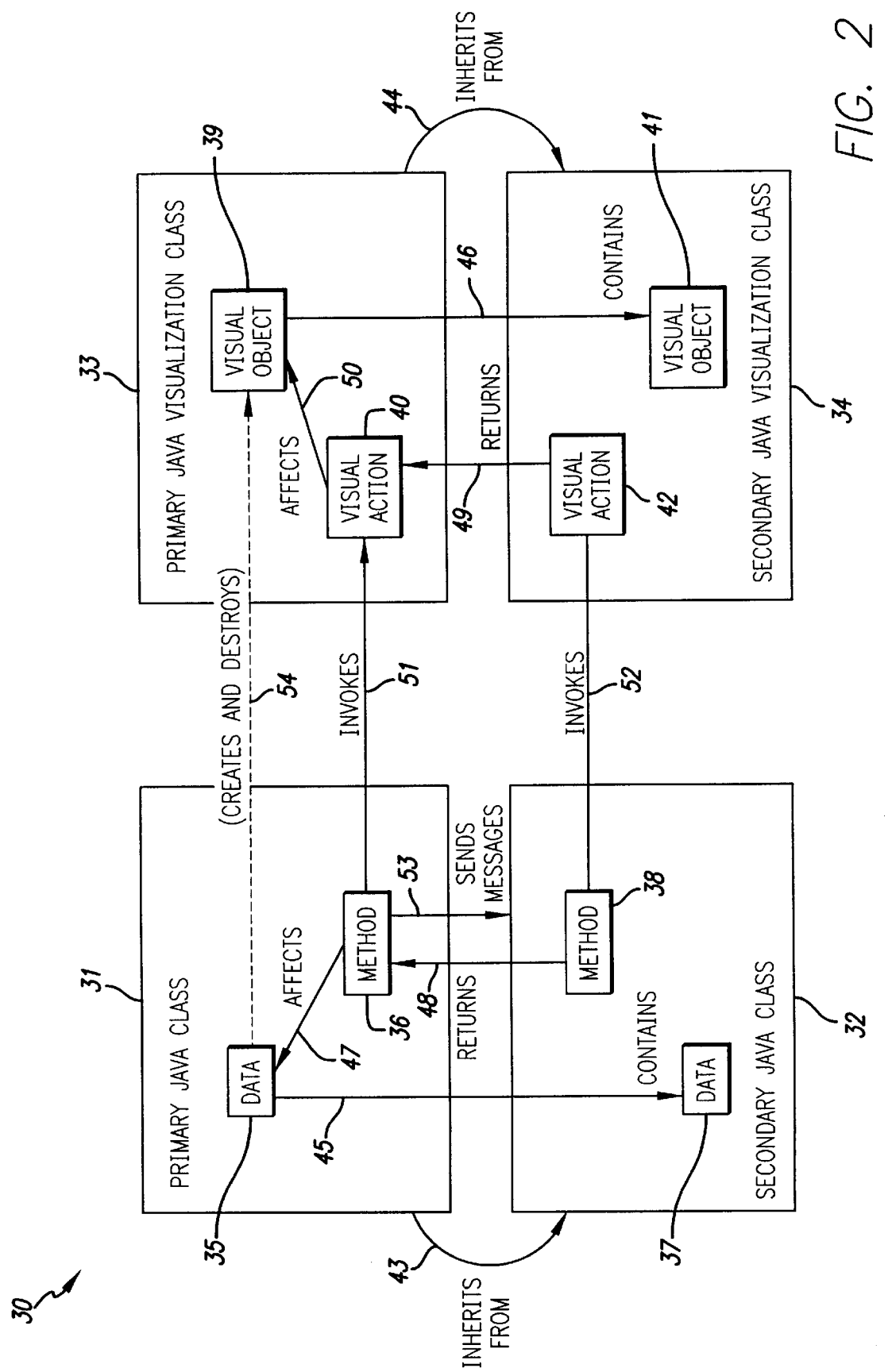
FIG. 2 shows, by way of example, a block diagram of a pair of Java classes each associated with a corresponding Java visualization class.

FIG. 2 shows, by way of example, a block diagram of a pair of Java classes 31, 32 each associated with a corresponding Java visualization class 33, 34. The Java visualization classes 33, 34 are "shadow" Java classes corresponding to each Java class 31, 32 for providing visualization of the program code internal state during execution. Thus, each Java class 31, 32 has at least one associated Java visualization class 33, 34 stored in the visualization library 14 (shown FIG. 1).

In the present example, the pair of Java classes 31, 32 are structured with the secondary Java class 32 inheriting 43 from the primary Java class 31. Likewise, the pair of Java visualization classes 33, 34 are structured with the secondary Java visualization class 34 inheriting 44 from the primary Java visualization class 33. Each Java class 31, 32 respectively define data objects 35, 37 and methods 36, 38 which are referenced in one or more of the program instructions. The data object 35 of the primary Java class 31 contains 45 the data object 37 of the secondary Java class 32. The method 36 of the primary Java class 31 affects 47 the data object 35 of the primary Java class 31. The method 38 of the secondary Java class 32 returns values to 48 the method 36 of the primary Java class 31. Moreover, the method 36 of the primary Java class 31 sends messages 53 to the secondary Java class 32. Similarly, each Java visualization class 33, 34 defines visual objects 39, 41 and visual actions 40, 42. The visual object 39 of the primary Java visualization class 33 contains 46 the visual object 41 of the secondary Java visualization class 34. The visual action 40 of the primary Java visualization class 33 affects 50 the visual object 39 of the primary Java visualization class 33. The visual action 42 of the secondary Java visualization class 34 returns values to 46 the method 40 of the primary Java visualization class 33.

During execution, at least one data object 35 of the primary Java class 31 creates and destroys 54 a corresponding visual object 39 of the primary Java visualization class 33. Invocations of each of the methods 36, 38 of the Java classes 31, 32 respectively invoke 51, 52 at least one corresponding visual action 40, 42 of the Java visualization classes 33, 34.

Visualization displaying on a GUI can be implemented by using the VM 25 (shown in FIG. 1) to interpret and execute each appropriate visualization call for a visual action 40, 42. Each Java visualization class stored in the visualization library 14 (shown in FIG. 1) maintains information regarding the relationships of the corresponding visualized data objects in relation to other Java classes. Thus, in the present example, the Java visualization classes 33, 34 maintain information about the data objects 35, 37 of the Java classes 31, 32. The VM 25 is used to maintain and visualize the Java class relationships.

A. Example 1: Integer Stack Contained in Application Checker

Figure 3:
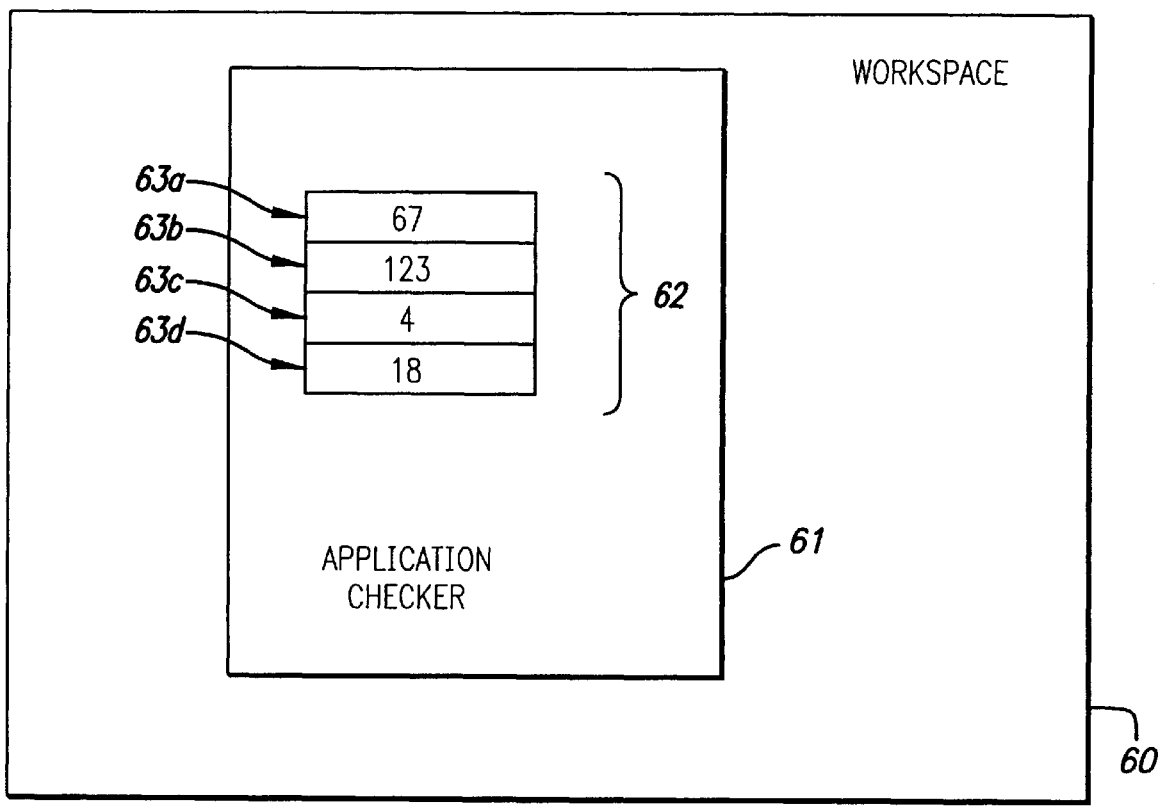
FIG. 3 shows, by way of example, a workspace on a graphical user interface for displaying the Java classes and Java visualization classes of FIG. 2.

FIG. 3 shows, by way of example, a workspace 60 on a GUI for displaying the Java classes 31, 32 and Java visualization classes 33, 34 of FIG. 2. The monitor 21 (shown in FIG. 1) displays the workspace 60 on the GUI as conventional in the art. FIG. 3 illustrates a set of distributed interacting software components for implementing a stack of integers with visualization provided according to the present invention. An application checker 61 is implemented as the primary Java class 31 (shown in FIG. 2). A visualized stack 62 is implemented as the secondary Java class 32 (shown in FIG. 2). The integers "67", "123," "4" and "18" stored in the data object 37 of the secondary Java class 31 are visualized as numbers appearing in boxes 63a–d stacked to represent a stack of integers 62. In turn, the visualized stack 62 is visualized as a visual object appearing in the application checker 61.

During execution, when a push method is executed to place a new integer onto the stack, the visualized stack 62 is "grown" by adding a new box to the top of the visualized stack 62 with the pushed integer inside the box. Similarity, when a pop method is executed to remove an integer from the stack, the visualized stack 62 is "shrunk" by deleting a box from the top of the visualized stack 62.

The visualized stack 62 is created by calling the visual action 42 of the secondary Java visualization class 34 (shown in FIG. 2). The application checker 61 is created by calling the visual action 39 of the primary Java visualization class 33 (shown in FIG. 2). Further visualized stacks for hold values other than integers can be created using a visual action for the particular object type by using one of the Java visualization classes stored in the visualization library 14 (shown in FIG. 1).

Each visual object 39 can have one or more associated visual actions 40. For instance, a visual object called "stack_visualizer" used in Example 1 could have the following associated visual actions:

| Visual Action Name | Source Program Methods |
|---|---|
| "push_action" | Corresponds to a push method |
| "pop_action" | Corresponds to a pop method |
| "clear_action" | Corresponds to a clear method |

B. Example 2: Input Form

A second example (not shown) of an application using the visualization techniques of the present invention is an input form, such as a visa application. The visa application can be visualized as a graphical representation of a form with fields for holding data values. Visual actions can allow the reading, writing and deleting of fields within the application to be visualized by displaying how each form entry is copied, written to and deleted.

C. Example 3: Processing Form

A third example (not shown) of an application using the visualization techniques of the present invention is the processing of the input form described in Example 2. A distributed interacting component that pre-processes the visa application can be visualized by copying values out of the visa application and comparing them to predetermined values. The result of the pre-processing can be visualized by adding an "approved" or "rejected" indicator on the input form. The unprocessed visa application can also reside on a visualized stack 62, such as described with reference to FIG. 3.

III. Process for Providing Visualization of Program Code Internal State

Figure 4:
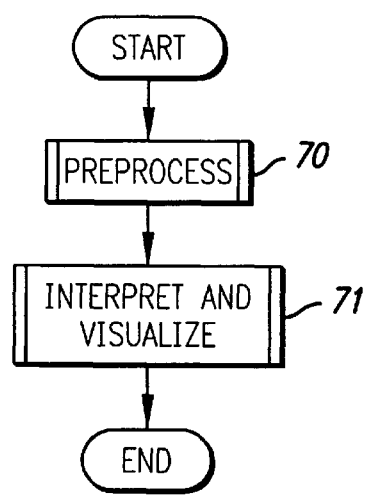
FIG. 4 is a flow diagram of a process for providing visualization of program code internal state in an object-oriented programming language according to the present invention.

FIG. 4 is a flow diagram of a process for providing visualization of program code internal state in an OOL according to the present invention. The process is illustrated and described as a series of process steps. As would be clear to one skilled in the art, the process steps can be embodied as code for a computer program for operation on a conventional programmed digital computer, such as system 10 (shown in FIG. 1). The program code can be embodied as a computer program on a computer-readable storage medium or as a data signal in a carrier wave transmitted over network 27.

The program to be visualized is written as Java source code and stored in the Java code library 16 (shown in FIG. 1). The Java source code is pre-processed (block 70) using the pre-processor 12 (shown in FIG. 1) for augmenting the Java source code with the Java visualization classes 33, 34 (shown in FIG. 2) from the visualization library 14 (shown in FIG. 1) as further described hereinbelow with reference to FIG. 5. Upon completion of pre-processing (block 70), the resulting source code with visualization calls is interpreted and visualized (block 71) using the VM 25 (shown in FIG. 1) as further described hereinbelow with reference to FIG. 6.

Figure 5:
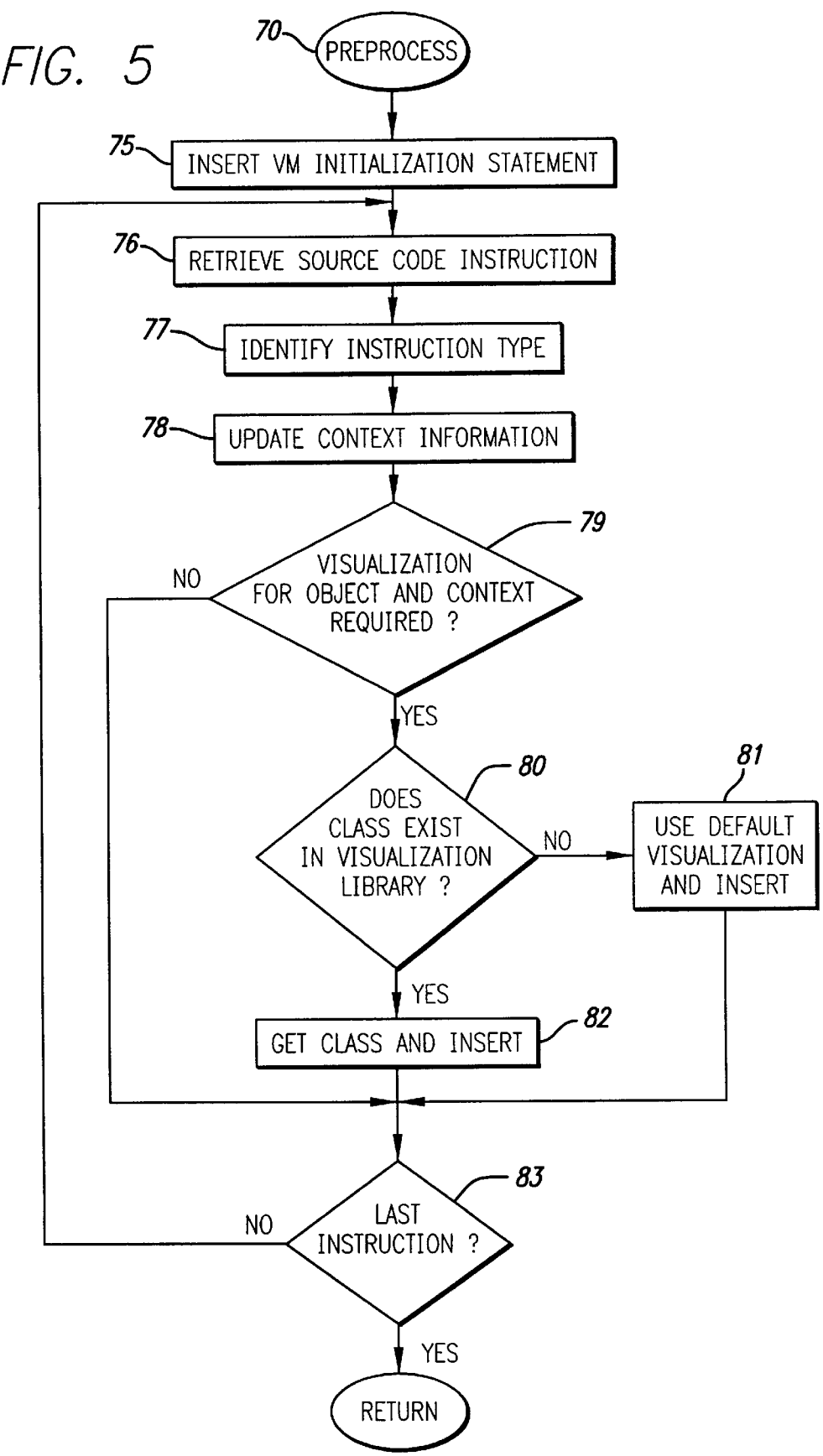
FIG. 5 is a flow diagram of a routine for preprocessing program source code used by the process of FIG. 4.

FIG. 5 is a flow diagram of the routine for preprocessing program source code (block 70) used by the process of FIG. 4. The purpose of the routine is to categorize individual source code instructions and insert the appropriate visualization routine calls. Briefly, the pre-processor 12 inserts the necessary Java code for signaling the VM 25 to visualize an object of the appropriate data type nested inside any enclosing visualization object, thereby capturing the program code internal state.

The pre-processor 12 begins by inserting a VM 25 initialization statement (block 75) for starting the VM 25 running during execution. In a further embodiment, initialization is indirectly performed by instantiating a visualization manager object in the source code. Initialization is subsequently performed when the constructor for the visualization manager object is called. Next, a source code instruction is retrieved (block 76) and identified (block 77). The context information of the data variables contained therein is updated (block 78). If visualization for the object and its context are required (block 79), the following decision is performed. If, for the class whose source code is currently being preprocessed there exists a corresponding visualization class in the visualization library 14 (block 80), the appropriate visualization class is obtained from the visualization library 14 and an instantiation of that visualization class is inserted into the source code (block 82). Otherwise, if the class does not have a corresponding visualization class in the visualization library 14 (block 80), a default visualization class is used and an instantiation of that visualization class is inserted into the source code (block 81). If visualization for the object and its context are not required (block 79), no changes are made to the source code. For each method call in the source code, a call to the corresponding visual action is inserted by the pre-processor in the source code. If the current instruction is not the last instruction (block 83) in the source code, execution continues with the retrieval and identification of next source code instruction (blocks 76 and 77). Otherwise, if the current instruction is the last instruction (block 83), the routine returns.

Figure 6:
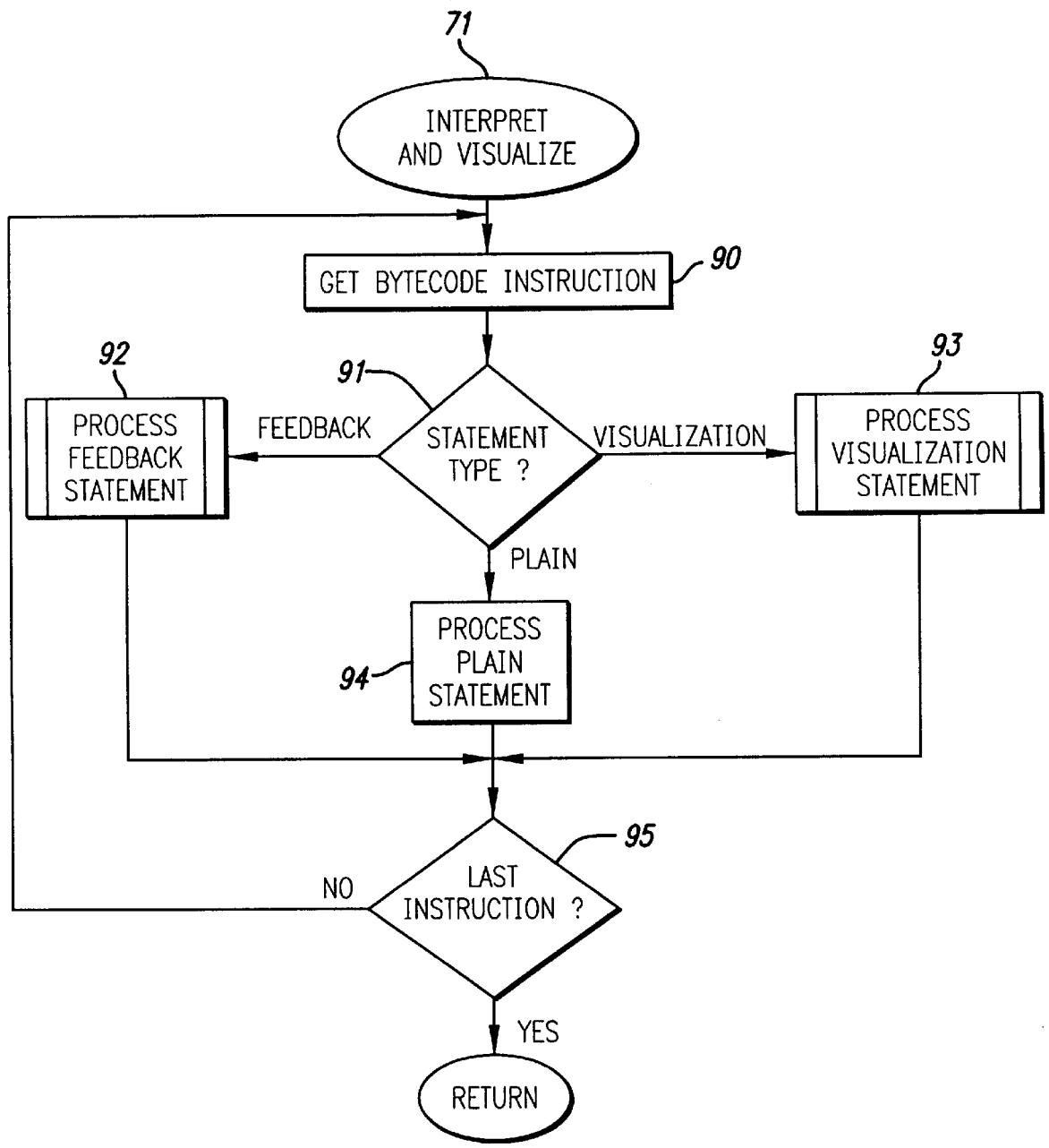
FIG. 6 is a flow diagram of a routine for interpreting and visualizing program byte codes used by the process of FIG. 4.

FIG. 6 is a flow diagram of the routine for interpreting and visualizing program byte codes (block 71) used by the process of FIG. 4. The purpose of the routine (block 71) is to execute each byte code instruction for the program and to visualize its context and internal state of the program accordingly. Briefly, the pre-processed source code is implicitly compiled into byte code instructions and executed by the VM 25. The present discussion assumes the standard Java compiler 13 transforms the pre-processed source code into the byte code instructions which are interpreted by the standard Java interpreter 17.

The VM 25 obtains (block 90) and identifies (block 91) each byte code instruction. If the byte code instruction is a feedback statement (block 91), the feedback statement is processed (block 92) as further described hereinbelow with reference to FIG. 7. If the byte code instruction is a visualization statement (block 91), the visualization statement is processed (block 93) as further described hereinbelow with reference to FIG. 8. Finally, if the byte code instruction is a plain, non-feedback and non-visualization statement (block 91), the plain statement is processed (block 94) as conventional in the art. If this instruction is not the last instruction (block 95), execution continues with the obtaining of the next byte code instruction (block 90). Otherwise, if this instruction is the last instruction (block 95), the routine returns.

Figure 7:
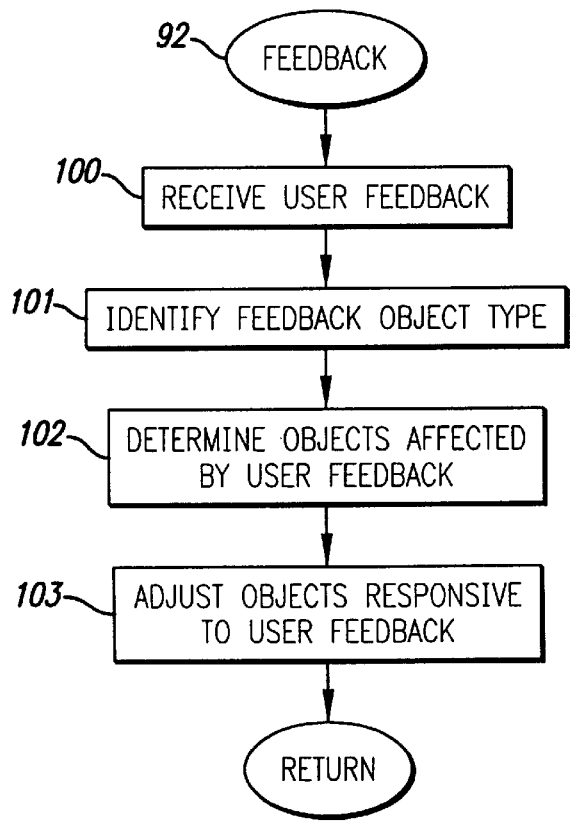
FIG. 7 is a flow diagram of a routine for processing feedback statements used by the routine of FIG. 6.

FIG. 7 is a flow diagram of the routine for processing feedback statements (block 92) used by the routine of FIG. 6. The purpose of the routine is to interface with the user using the interfacing devices 19, 20, 21 (shown in FIG. 1). For example, one form of feedback might be to zoom in on a component object. The VM receives user feedback (block 100) and identifies the feedback object type (block 101). The VM then determines the objects affected by the user feedback (block 102). The object is adjusted responsive to the feedback (block 103). The routine then returns.

Figure 8:
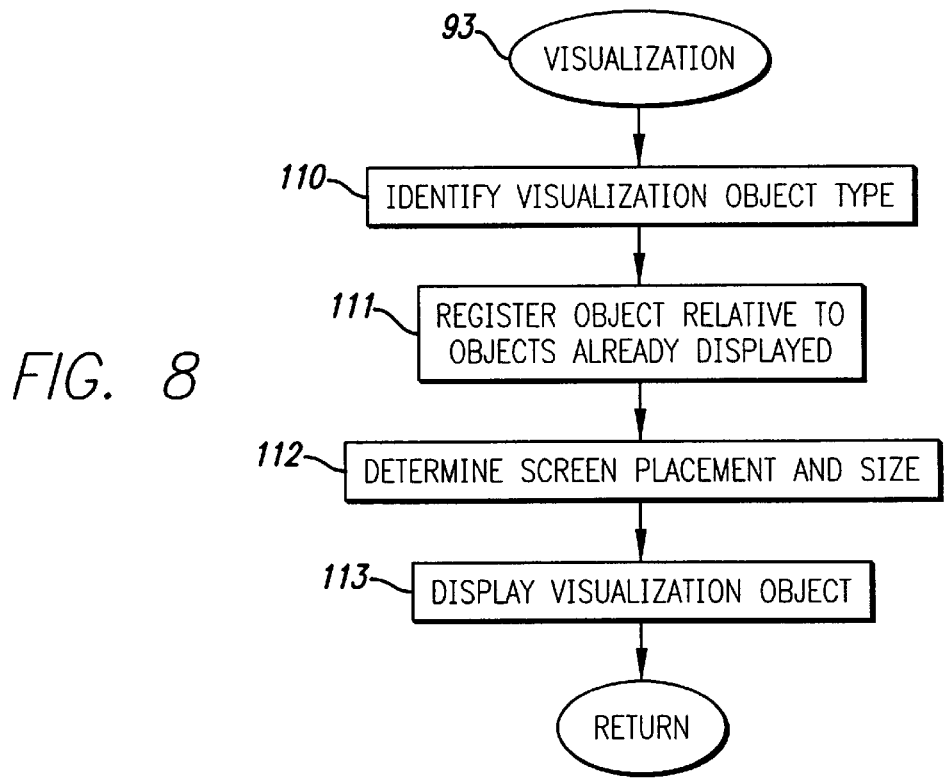
FIG. 8 is a flow diagram of a routine for processing visualization statements used by the routine of FIG. 6.

FIG. 8 is a flow diagram of the routine for processing visualization statements (block 93) used by the routine of FIG. 6. The purpose of the routine is to graphically display a visualized object using a GUI on the monitor 21(shown in FIG. 1). The VM 25 identifies the visualization object type (block 110). The object is registered relative to those objects already displayed on the GUI (block 111). Based on the visualization object type, the screen placement and size of the object are determined (block 112) and the visualization object is displayed (block 113). The routine then returns.

The present invention enables the visualization of the internal state of distributed interacting software components while maintaining the integrity of the application program, thereby increasing the effectiveness of debugging efforts. Context and state information, such as identifying objects storing data internally, counting numbers of components and so forth, are maintained by the visualization classes. The visualization classes enable the visualization to be context-sensitive whereby the relationships of the hierarchally nested objects can be graphically displayed on a GUI. Moreover, unnecessary information can be filtered from being displayed using the visualization manager interactively or by providing appropriately customized visualization classes. The forgoing features are useful for debugging particular types of error conditions, such as memory leaks, uninitialized variables and dangling pointers in languages which support pointer types. Users of the invention can also understand how one software component uses other components and where such uses are faulty.

In addition, the visualization techniques of the present invention can be used for examining the impact of program code changes. For examples, all changes to the system and current revision can be displayed in a particular color, such as red. The technique can be extended to illustrate how other changes propagate through the old program code, for instance, from red to pink to blue. This technique would facilitate the debugging of legacy systems that are undergoing change.

While the invention has been particularly shown and described with reference to embodiments thereof, those skilled in the art will understand that the foregoing and other changes in form and detail may be made therein without departing from the spirit and scope of the present invention.

What is claimed is:

1. A system for providing visualization of program code written in an object-oriented programming language, the program code having a plurality of instructions with each such instruction including at least one of a data object and a corresponding data method, the system comprising:

a visualization library comprising a plurality of visualization classes, each visualization class comprising at least one visual object and at least one corresponding visual action;

a visual manager library comprising a plurality of visualization control classes, each visualization control class comprising at least one visualization control method;

a pre-processor for augmenting the program code with at least one visualization control method from at least one visualization control class in the visual manager library and associating the data object referenced in at least one instruction in the program code with at least one visual object from at least one visualization class in the visualization library and the corresponding data method referenced in the at least one instruction in the program code with the at least one corresponding visual action from the at least one visualization class in the visualization library; and a visual manager for executing the program code including the at least one visualization control method and the at least one visual action corresponding to the visual object associated with the data object referenced in the at least one instruction responsive to execution of the data method corresponding to the data object.

2. A system according to claim 1, wherein the visualization library comprises a plurality of functional levels, the system further comprising:

a first functional level stored in the visualization library comprising at least one visualization class comprising at least one visual object and at least one corresponding visual action operative to visualize a language construct;

a second functional level stored in the visualization library comprising at least one visualization class comprising at least one visual object and at least one corresponding visual action operative to visualize at least one of a foundation class, foundation package and foundation library; and a third functional level stored in the visualization library comprising at least one visualization class comprising at least one visual object and at least one corresponding visual action operative to visualize at least one of a foreign object, foreign class, foreign package and foreign library.

3. A system according to claim 1, further comprising a customization editor for modifying at least one such visualization class in the visualization library.

4. A system according to claim 1, wherein the pre-processor categorizes each instruction in the program code and inserts a call to the visual action corresponding to the visual object associated with the data object referenced in the instruction, the visual action comprising at least one of a default visualization action and a visualization class.

5. A system according to claim 1, wherein the visual manager identifies each such instruction in the program code and performs at least one such visual action responsive to at least one such data method in the instruction.

6. A system according to claim 5, wherein the data method comprises a feedback instruction, the visual manager receiving feedback from a user of the computer, identifying a type of the feedback and determining each such data object referenced in the instruction affected by the user feedback and adjusting the data object responsive to the user feedback.

7. A system according to claim 5, wherein the data method comprises a visualization instruction, the visual manager identifying a type of the visual object, registering the visual object relative to each such visual object already displayed, determining a screen placement and size for the visual object based on the type of the visual object and displaying the visual object.

8. A process using a computer for providing visualization of program code written in an object-orient programming language, the program code having a plurality of instructions with each such instruction including at least one of a data object and a corresponding date method, the process comprising the steps of:

storing a visualization library comprising a plurality of visualization classes, each visualization class comprising a least one visual object and at least one corresponding visual action;

storing a visual manager library comprising a plurality of visualization control classes, each visualization control class comprising at least one visualization control method;

augmenting, using a preprocessor, the program code with at least one visualization control method from at least one visualization control class in the visualization control class in the visual manager library and associating, using the pre-processor the data object referenced in at least one instruction in the program code with at least one visual object from at least one visualization class in the visualization library and the corresponding data method reference in the at least one instruction in the program code with the at least one corresponding visual action from the at least one visualization class in the visualization library; and executing, using a visual manager the program code including the at least one visualization control method and the at least one visual action corresponding to the visual object associated with the data object referenced in the at least one instruction responsive to execution of the data method corresponding to the data object.

9. A process according to claim 8, wherein the visualization library comprises a plurality of functional levels, the process further comprising the steps of:

storing into a first functional level of the visualization library at least one visualization class comprising at least one visual object and at least one corresponding visual action operative to visualize a language construct;

storing into a second functional level of the visualization library at least one visualization class comprising at least one visual object and at least one corresponding visual action operative to visualize at least one of a foundation class, foundation package and foundation library; and storing into a third functional level of the visualization library at least one visualization class comprising at least one visual object and at least one corresponding visual action operative to visualize at least one of a foreign object, foreign class, foreign package and foreign library.

10. A process according to claim 8, further comprising the step of modifying at least one such visualization class in the visualization library using a customization editor.

11. A process according to claim 8, wherein the step of associating the data object further comprises the steps of:

categorizing each instruction in the program code; and inserting a call to the visual action corresponding to the visual object associated with the data object referenced in the instruction, the visual action comprising at least one of a default visualization action and a visualization class.

12. A process according to claim 8, wherein the step of executing the program code further comprises the steps of:

identifying each such instruction in the program code; and performing at least one such visual action responsive to at least one such data method in the instruction.

13. A process according to claim 12, wherein the data method comprises a feedback instruction, the step of performing at least one such visual action further comprising the steps of:

receiving feedback from a user of the computer;

identifying a type of the feedback and determining each such data object referenced in the instruction affected by the user feedback; and adjusting the data object responsive to the user feedback.

14. A process according to claim 12, wherein the data method comprises a visualization instruction, the step of performing at least one such visual action further comprising the steps of:

identifying a type of the visual object;

registering the visual object relative to each such visual object already displayed;

determining a screen placement and size for the visual object based on the type of the visual object; and displaying the visual object.

15. A computer program embodied on a computer-readable medium for providing visualization of program code written in an object-oriented programming language, the program code having a plurality of instructions with each such instruction including at least one of a data object and a corresponding data method, the computer program comprising:

code for storing a visualization library comprising a plurality of visualization classes, each visualization class comprising at least one visual object and at least one corresponding visual action;

code for storing a visual manager library comprising a plurality of visualization control classes, each visualization control class comprising at least one visualization control method;

code a pre-processor executes for augmenting the program code with at least one visualization control method from at least one visualization control class in the visual manager library and code the pre-processor executes for associating the data object reference in at least one instruction in the program code with at least one visual object from at least one visualization class in the visualization library and the corresponding data method reference in the at least one instruction in the program code with the at least one corresponding visual action from the at least one visualization class in the visualization library; and code a visual manager executes for executing the program code including the at least one visualization control method and the at least one visual action corresponding to the visual object associated with the data object referenced in the at least one instruction responsive to execution of the data method corresponding to the data object.

16. A computer program according to claim 15, wherein the visualization library comprises a plurality of functional levels, the computer program further comprising:

code for storing into a first functional level of the visualization library at least one visualization class comprising at least one visual object and at least one corresponding visual action operative to visualize a language construct;

code for storing into a second functional level of the visualization library at least one visualization class comprising at least one visual object and at least one corresponding visual action operative to visualize at least one of a foundation class, foundation package and foundation library; and code for storing into a third functional level of the visualization library at least one visualization class comprising at least one visual object and at least one corresponding visual action operative to visualize at least one of a foreign object, foreign class, foreign package and foreign library.

17. A computer program according to claim 15, further comprising code for modifying at least one such visualization class in the visualization library using a customization editor.

18. A computer program according to claim 15, wherein the code for associating the data object further comprises:

code for categorizing each instruction in the program code; and code for inserting a call to the visual action corresponding to the visual object associated with the data object referenced in the instruction, the visual action comprising at least one of a default visualization action and a visualization class.

19. A computer program according to claim 15, wherein the code for executing the program code further comprises:

code for identifying each such instruction in the program code; and code for performing at least one such visual action responsive to at least one such data method in the instruction.

20. A computer program according to claim 19, wherein the data method comprises a feedback instruction, the code for performing at least one such visual action further comprising:

code for receiving feedback from a user of the computer;

code for identifying a type of the feedback and determining each such data object referenced in the instruction affected by the user feedback; and code for adjusting the data object responsive to the user feedback.

21. A computer program according to claim 19, wherein the data method comprises a visualization instruction, the code for performing at least one such visual action further comprising:

code for identifying a type of the visual object;

code for registering the visual object relative to each such visual object already displayed;

code for determining a screen placement and size for the visual object based on the type of the visual object; and code for displaying the visual object.

22. A computer data signal embodied in a carrier wave for providing visualization of program code written in an object-oriented programming language, the program code having a plurality of instructions with each such instruction including at least one of a data object and a corresponding data method, the computer data signal comprising:

code for storing a visualization library comprising a plurality of visualization classes, each visualization class comprising at least one visual object and at least one corresponding visual action;

code for storing a visual manager library comprising a plurality of visualization control classes, each visualization control class comprising at least one visualization control method;

code, a preprocessor executes, for augmenting the program code with at least one visualization control method from at least one visualization control class in the visual manager library and code, the preprocessor executes, for associating the data object referenced in at least one instruction in the program code with at least one visual object from at least one visualization class in the visualization library and the corresponding data method referenced in the at least one instruction in the program code with the at least one corresponding visual action from the at least one visualization class in the visualization library; and code, a visual manager executes, for executing the program code including the at least one visualization control method and the at least one visual action corresponding to the visual object associated with the data object referenced in the at least one instruction responsive to execution of the data method corresponding to the data object.

* * * * *

UNITED STATES PATENT AND TRADEMARK OFFICE
CERTIFICATE OF CORRECTION

PATENT NO. : 6,052,515
DATED : April 18, 2000
INVENTOR(S) : Tilmann Bruckhaus

It is certified that error appears in the above-identified patent and that said Letters Patent is hereby corrected as shown below:

Column 11, line 54, change "data object and a corresponding date method, the process" to --data object and a corresponding data method, the process--.

Signed and Sealed this

Twenty-seventh Day of February, 2001

Attest:

NICHOLAS P. GODICI

Attesting Officer

Acting Director of the United States Patent and Trademark Office